(12) United States Patent
Matsuda et al.

(10) Patent No.: US 8,130,355 B2
(45) Date of Patent: Mar. 6, 2012

(54) LIQUID CRSYTAL DISPLAY DEVICE

(75) Inventors: Kunihiro Matsuda, Hamura (JP); Norihisa Yamada, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 322 days.

(21) Appl. No.: 12/239,722

(22) Filed: Sep. 26, 2008

(65) Prior Publication Data

US 2010/0066966 A1    Mar. 18, 2010

(30) Foreign Application Priority Data

Sep. 28, 2007  (JP) ................................ 2007-255897
Aug. 25, 2008  (JP) ................................ 2008-215802

(51) Int. Cl.
*G02F 1/1343* (2006.01)
(52) U.S. Cl. .......................... 349/147; 349/139; 349/143
(58) Field of Classification Search ................... 349/147
See application file for complete search history.

(56) References Cited

U.S. PATENT DOCUMENTS

| | | | | |
|---|---|---|---|---|
| 4,818,981 | A * | 4/1989 | Oki et al. | 345/92 |
| 4,937,539 | A * | 6/1990 | Grinberg et al. | 349/202 |
| 5,365,357 | A * | 11/1994 | Ohgawara et al. | 349/111 |
| 5,488,498 | A * | 1/1996 | Fujii et al. | 349/149 |
| 5,668,617 | A * | 9/1997 | Na | 349/156 |
| 5,982,471 | A * | 11/1999 | Hirakata et al. | 349/155 |
| 6,690,442 | B1 * | 2/2004 | Kohtaka et al. | 349/139 |
| 6,897,907 | B2 * | 5/2005 | Morimitsu | 349/42 |
| 7,700,952 | B2 * | 4/2010 | Park et al. | 257/72 |
| 2004/0245533 | A1 | 12/2004 | Imazeki et al. | |
| 2007/0013855 | A1 | 1/2007 | Ando et al. | |
| 2007/0159570 | A1 | 7/2007 | Nagasawa | |
| 2009/0050890 | A1 | 2/2009 | Hirakata et al. | |
| 2009/0061569 | A1 | 3/2009 | Hirakata et al. | |

FOREIGN PATENT DOCUMENTS

| | | |
|---|---|---|
| JP | 10-268335 A | 10/1998 |
| JP | H10-282515 A | 10/1998 |
| JP | 2003-121869 A | 4/2003 |
| JP | 2003-248237 A | 9/2003 |
| JP | 2004-318074 A | 11/2004 |

(Continued)

OTHER PUBLICATIONS

Korean Office Action in counterpart application KR 10-2008-0094416, dated Apr. 27, 2010, citing Foreign Patent Document Nos. 1-2 listed above and JP H10-268335, JP H18-323097 and JP H19-024963 which has been submitted in previous IDSs.

(Continued)

*Primary Examiner* — Michelle R Connelly Cushwa
(74) *Attorney, Agent, or Firm* — Chen Yoshimura LLP (57) ABSTRACT

A liquid crystal display device includes a first substrate having a common electrode thereon; a second substrate coupled to the first substrate, the second substrate having a connection electrode facing a portion of the common electrode on the first substrate, the connection electrode including a lower electrode made of metal, an insulating layer formed over the lower electrode and having a plurality of contact holes, and an upper electrode made of oxide conductor over the insulating layer, the upper electrode being electrically connected to the lower electrode via the plurality of contact holes; and a plurality of conductive gap members disposed between said portion of the common electrode and the upper electrode of the connection electrode to electrically connect said portion of the common electrode to the upper electrode of the connection electrode.

17 Claims, 10 Drawing Sheets

FOREIGN PATENT DOCUMENTS

| JP | 2005-352354 A | 12/2005 |
|---|---|---|
| JP | 2006-098441 A | 4/2006 |
| JP | 2006-323097 A | 11/2006 |
| JP | 2007-024963 A | 2/2007 |
| JP | 2007-065150 A | 3/2007 |
| JP | 2007-213003 A | 8/2007 |

OTHER PUBLICATIONS

Japanese Office Action, dated Aug. 4, 2009, in counterpart Japanese application No. 2008-215802. Concise Explanation of Relevance: The Japanese Office Action rejects claims in the Japanese application in view of JP 10-268335 which has been submitted in previous IDS. This Japanese Office Action without the English translation was filed on Sep. 10, 2009.

Japanese Office Action dated Mar. 23, 2010, in a counterpart Japanese patent application No. 2008-215802. Concise Explanation of Relevance: The Japanese Office Action rejects claims in the Japanese application in view of 2006-323097, JP10-268335 and JP2007-024963 which have been submitted in previous IDSs. This Japanese Office Action without the English translation was filed on Jun. 21, 2010.

Japanese Office Action, dated Nov. 2, 2010 in counterpart Japanese application No. 2008-215802. Concise explanation of relevance: The Japanese Office Action rejects claims in the Japanese application in view of H10-282515 and JP2006-323097 which have been submitted in a previous IDS. This Japanese Office Action without the English translation was filed on Nov. 23, 2010.

\* cited by examiner

LIQUID CRSYTAL DISPLAY DEVICE

This application claims the benefit of Japanese Applications No. 2007-255897, filed in Japan on Sep. 28, 2007, and No. 2008-215802, filed in Japan on Aug. 25, 2008, both of which are hereby incorporated by reference in their entireties.

BACKGROUND OF THE INVENTION

1. Field of the Invention

This invention relates to a liquid crystal display.

2. Description of the Related Art

In recent years, liquid crystal display devices are being used as a display device that is thin, light weight, and space-saving, and has a less power consumption. In particular, devices with two substrates with liquid crystal interposed in between: one substrate having a plurality of thin film transistor (TFTs) and a plurality of pixel electrodes thereon in a matrix form; and another substrate having color filters (CFs) thereon for enabling color display, are called "active matrix type," and are very popular nowadays. Here, the glass substrate on which TFTs are disposed is called the "TFT substrate." And the glass substrate that has color filters is called the "CF substrate." Typically, the CF substrate has a common electrode formed thereon, and the TFT substrate has a connection electrode (hereinafter also referred to as "transfer electrode") that is used for connecting the TFT substrate to the common electrode of the CF substrate.

Figure 10:
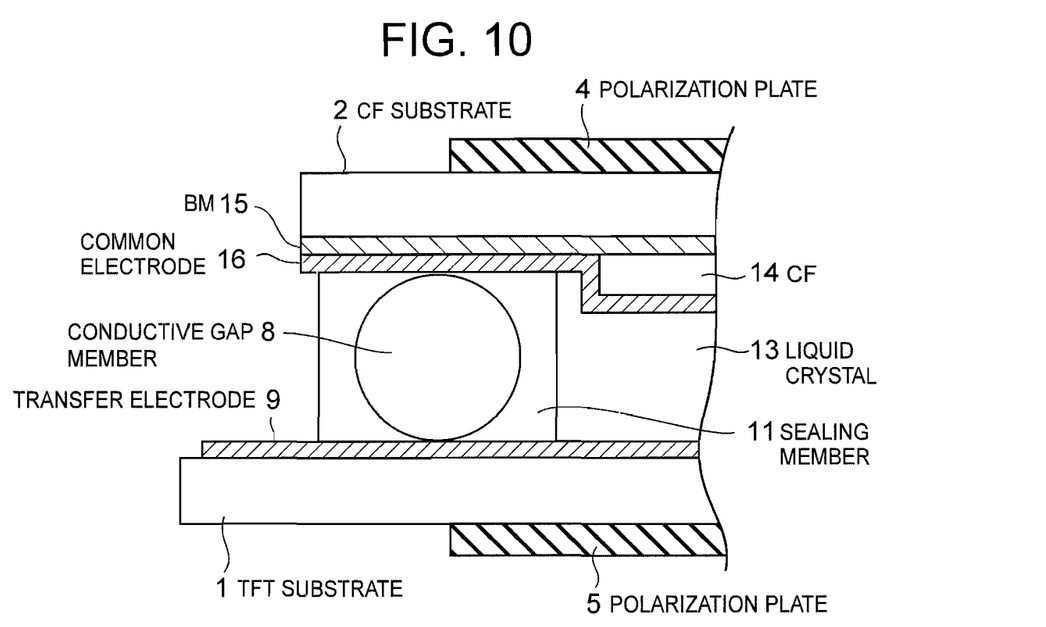
FIG. 10 is a cross-sectional view of a transfer electrode and its surrounding structure in a conventional liquid crystal display.

In a conventional active matrix type liquid crystal displays, a transfer electrode on the TFT substrate is connected to the common electrode on the CF substrate via conductive particles. FIG. 10 is a schematic cross-sectional view of such a structure. TFT substrate 1 and CF substrate 2 are coupled to face each other with a set spacing. On the TFT substrate 1, a plurality of TFTs and a plurality of pixel electrodes respectively connected to the TFTs are disposed. In addition, a transfer electrode 9 is formed near the edge of the TFT substrate 1. A polarization plate 5 is affixed on the lower surface of the TFT substrate 1.

Another polarization plate 4 is affixed on the upper surface of the CF substrate 4. On the lower surface of the CF substrate 2, color filters 14, which allow light of specific wavelengths to pass there through, and a black matrix (BM) 15 for light shielding are provided. A common electrode 16, which is formed of a transparent conductive material, such as ITO (Indium Tin Oxide), is disposed on the color filters 14 and the black matrix 15. Liquid crystal 3 fills a space formed between the pixel electrodes of the TFT substrate 1 and the common electrode 16 of the CF substrate 2.

Here, the TFT substrate 1 and the CF substrate 2 are coupled via a sealing member 11. In order to set the cell gap to a prescribed value, spacers, which have a size that corresponds to the desired cell gap, and conductive gap members 8, which are conductive particles having a uniform diameter disposed in the sealing member 11, are provided. The transfer electrode 9 of the TFT substrate 1 and the common electrode 16 of the CF substrate 2 are electrically connected via conductive gap members 8.

In the liquid crystal display device described above, the transfer electrode is formed of a metallic material having a relatively low resistivity, such as Al, Mo. However, as shown in FIG. 10, a portion of the transfer electrode is exposed to the exterior at one edge of the TFT substrate, for example. Because of this, the exposed portion of the transfer electrode can be damaged by degradation and/or corrosion that occur due to moisture in the air and/or as a result of exposure to corrosive atmosphere, causing disconnection and poor reliability.

SUMMARY OF THE INVENTION

Accordingly, the present invention is directed to a liquid crystal display device that substantially obviates one or more of the problems due to limitations and disadvantages of the related art.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a liquid crystal display device, including a first substrate having a common electrode thereon; a second substrate coupled to the first substrate, the second substrate having a connection electrode facing a portion of the common electrode on the first substrate, the connection electrode including a lower electrode made of metal, an insulating layer formed over the lower electrode and having a plurality of contact holes, and an upper electrode made of oxide conductor over the insulating layer, the upper electrode being electrically connected to the lower electrode via the plurality of contact holes; and a plurality of conductive gap members disposed between said portion of the common electrode and the upper electrode of the connection electrode to electrically connect said portion of the common electrode to the upper electrode of the connection electrode.

In another aspect, the present invention provides a liquid crystal display device, including a first substrate having a pad thereon; a second substrate coupled to the first substrate, the second substrate having a connection electrode facing said pad on the first substrate, an upper surface of the connection electrode being made of conductive oxide and having a plurality of recesses; and a plurality of conductive gap members disposed between said pad on the first substrate and the connection electrode on the second substrate to electrically connect said pad to the connection electrode, the plurality of conductive gap members being dispersed over the connection electrode such that some of the plurality of conductive gap members are rested in said recesses in the upper surface of the connection electrode and some of the plurality of conductive gap members are rested in other areas and are in contact with both said pad and the upper surface of the connection electrode.

In another aspect, the present invention provides a method of forming a liquid crystal display, including preparing a first substrate having a pad thereon; preparing a second substrate having a connection electrode, an upper surface of the connection electrode being made of conductive oxide and having a plurality of recesses; dispersing a plurality of conductive gap members over the connection electrode of the second substrate; and coupling the first substrate and the second substrate such that the connection electrode faces said pad on the first substrate and such that some of the plurality of conductive gap members are rested in said recesses in the upper surface of the connection electrode and some of the plurality of conductive gap members are rested in other areas and in contact with both said pad and the upper surface of the connection electrode.

It is to be understood that both the foregoing general description and the following detailed description are exemplary and explanatory, and are intended to provide further explanation of the invention as claimed.

DETAILED DESCRIPTION OF THE PREFERRED EMBODIMENTS

Embodiments of the present invention will be described with reference to the appended drawings.

Figure 1:
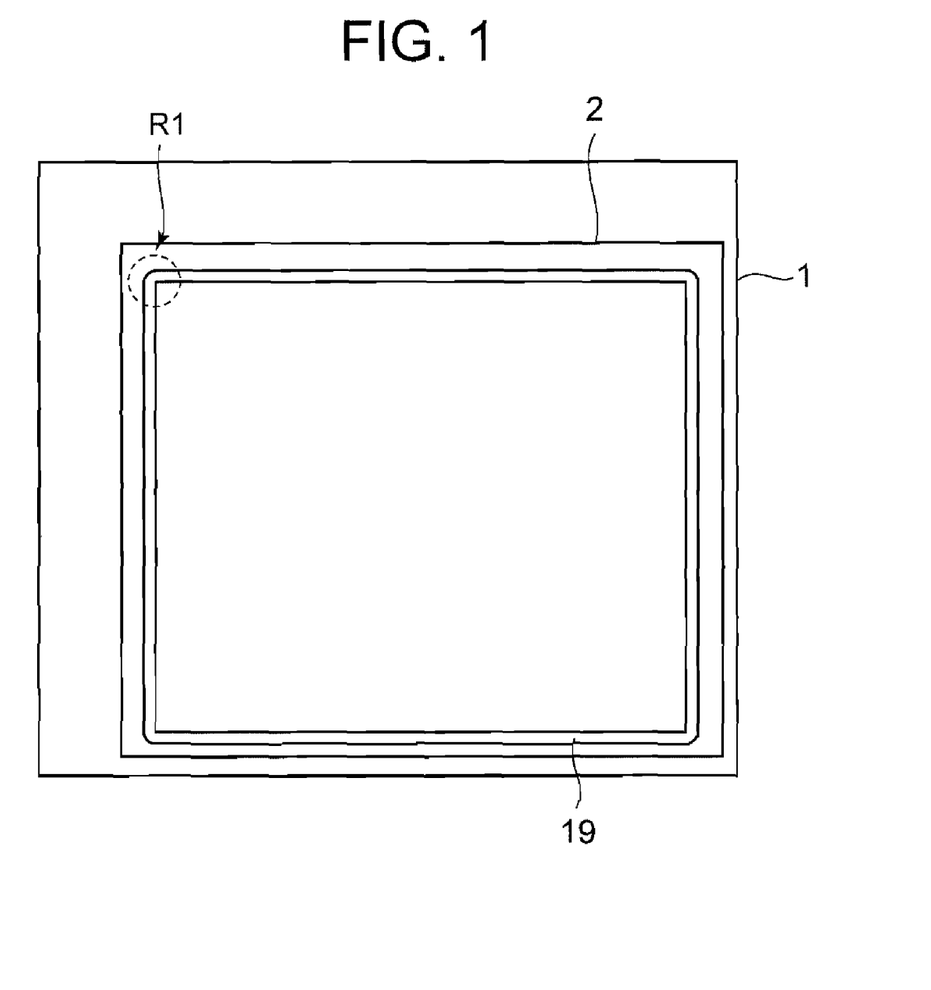
FIG. 1 schematically shows a plan view of a liquid crystal display.
Figure 2A:
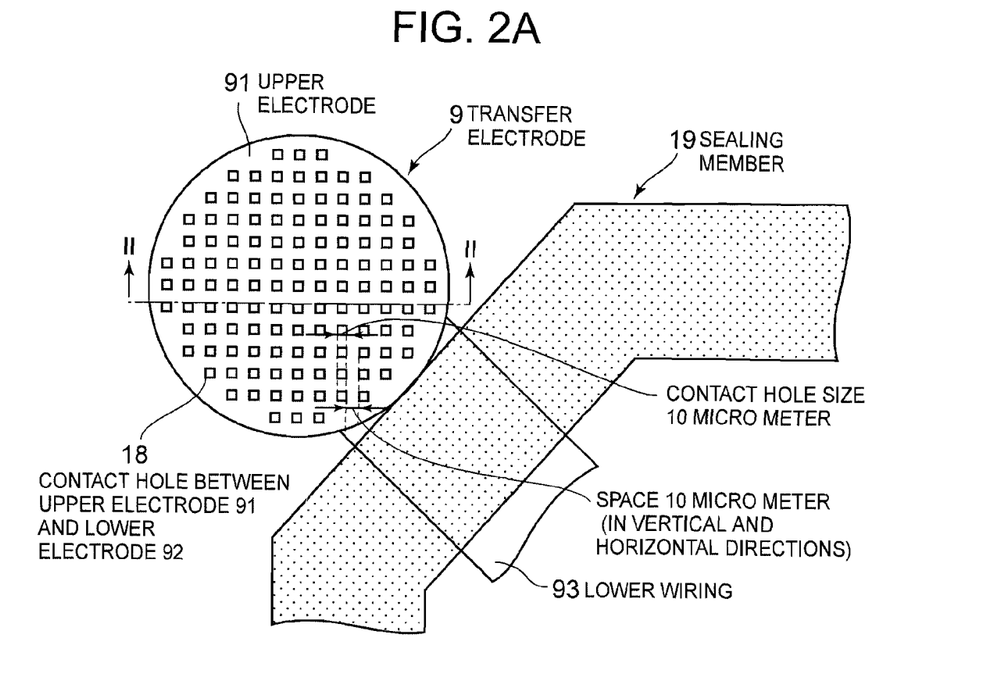
FIG. 2A is a plan view of a portion f a liquid crystal display according to an embodiment of the present invention.
Figure 2B:
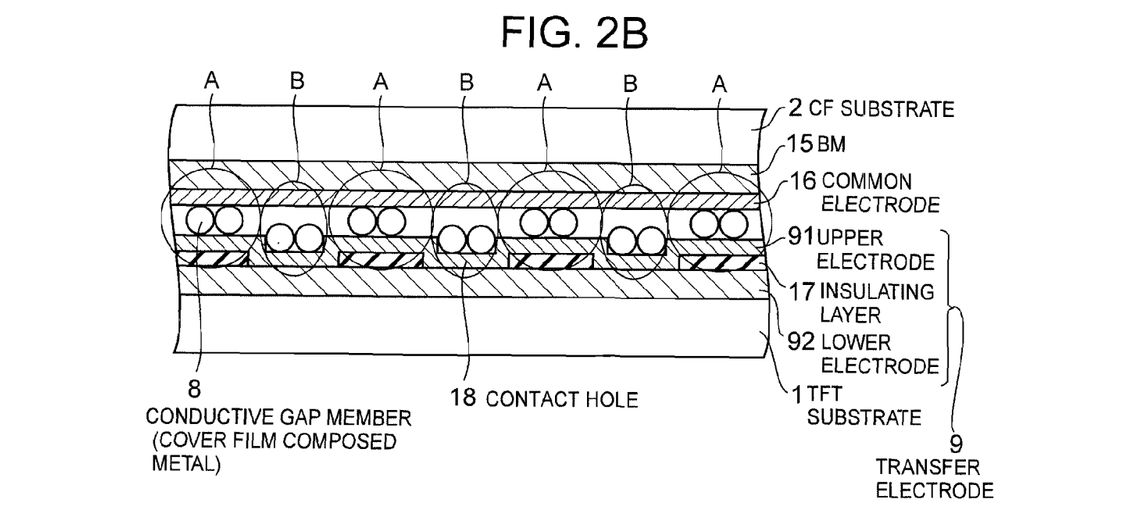
FIG. 2B is a cross-sectional view taken along the line II-II of FIG. 2A.

FIG. 1 schematically shows a plan view of a liquid crystal display. FIG. 2A is a plan view of a portion of a liquid crystal display according to an embodiment of the present invention. FIG. 2B is a cross-sectional view taken along the line II-II of FIG. 2A. A lower electrode 92 is formed on a TFT substrate 1. The lower electrode 92 is formed of a relatively low resistivity metal, such as Al, Mo. An insulating layer 17 is formed on the lower electrode 92. Further, an upper electrode 91 is formed on the insulating layer 17. The upper electrode 91 is formed of corrosion resistance material, such as ITO (Indium Tin Oxide), ZnO or other like material. The upper electrode 91 and the lower electrode 92 together constitute a transfer electrode 9 that is used as a connection electrode for connecting to common electrode 16. A plurality of contact holes 18 are formed in the insulating layer 17. The upper electrode 91 is connected to the lower electrode via the contact holes 18. The size of the contact holes may be, for example, a square of 10 µm×10 µm. The spacing between the two adjacent contact holes may be, for example, about 10 µm.

A plurality of conductive gap members are dispersed between the common electrode 16 (or a pad or a portion of the common electrode) and the upper electrode 91. The common electrode 16 is electrically connected to the transfer electrode 9 via the conductive gap members 8. Here, it is preferable to dispose, by way of a dispenser, for example, a dispersion material that is mixed with the conductive gap members over the transfer electrode 9 in advance of coupling the TFT substrate 1 with the CF substrate 2. This way, the conductive gap members 8 can be dispersed substantially uniformly over the transfer electrode 9. Alternatively, such a dispersion material may be disposed on an appropriately structured common electrode 16 (or a pad or a portion thereof) at a location corresponding to the transfer electrode 9 to ensure uniform disposition of the conductive gap members 8. A sealing member that is used for cementing the TFT substrate 1 with the CF substrate 2 can be mixed with conductive gap members 8 before undergoing curing, and can be used as the appropriate dispersion material.

The conductive gap members 8 may be formed of an insulating material having a conductive coating thereon.

As shown above, in this embodiment, the transfer electrode 9 can significantly withstand corrosive atmospheres and therefore the reliability is improved because a conductive oxide material, such as ITO, ZnO, which is a relatively corrosion resistance material, is disposed over the lower electrode 92 formed of metal, such as Al, Mo, which is relatively susceptible to corrosion. Moreover, because the upper electrode 91 is connected to the lower electrode 92 via a plurality of contact holes formed in the insulating layer 17, the upper electrode 91, which is formed of conductive oxide, is reliably affixed on the TFT substrate.

As FIGS. 1 and 2A show, a sealing member 19 is provided to couple the TFT substrate 1 with the CF substrate 2 to seal the space in between. The lower electrode 92 may be connected to an auxiliary capacitance line Ls, for example, via a lower wiring 93 that goes under the sealing member 19.

Figure 3A:
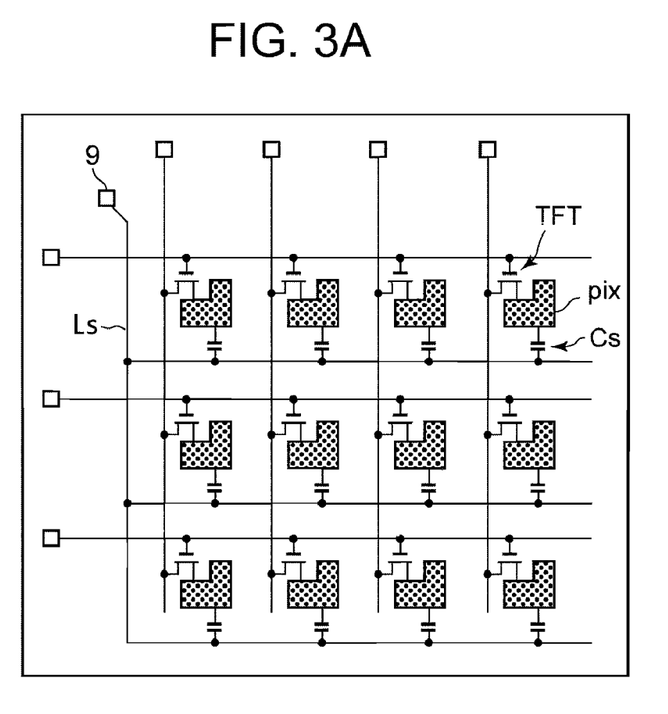
FIG. 3A schematically shows a TFT substrate for a liquid crystal display.
Figure 3B:
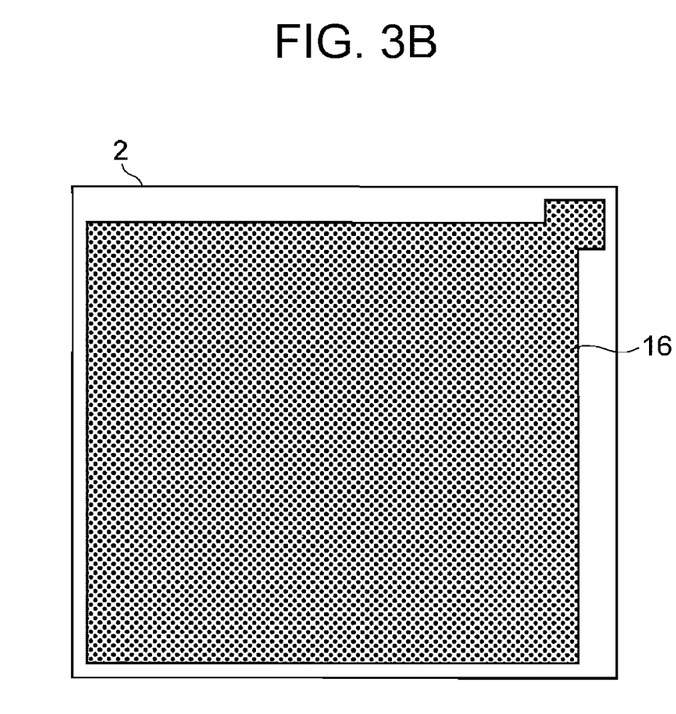
FIG. 3B schematically shows a CF substrate for a liquid crystal display.

Therefore, in one form of embodiment of the present invention, as shown in FIG. 3A, a plurality of active elements TFTs and a plurality of pixel electrodes PIX respectively connected to the TFTs are formed on the TFT substrate 1. The auxiliary capacitance lines Ls form auxiliary capacitances Cs together with the pixel electrodes PIX. As shown in FIG. 3B, the common electrode 16 is formed on the CF substrate in this example. The auxiliary capacitance line Ls may be electrically connected to the common electrode 16. This connection may be established by the transfer electrode and the conductive gap members described above. The sealing member 19 seals the space between the TFT substrate 1 and the CF substrate 2, and liquid crystal is charged in the sealed space.

Here, as shown in FIG. 2B, the common electrode 16 is electrically connected to the upper substrate 91 of the TFT substrate 1 via the conductive gap members 8 at locations indicated by "A" in FIG. 2B. However, at locations indicated by "B" in FIG. 2B, conductive gap members 8 are rested in locations that correspond to contact holes 18. Therefore many of the conductive gap members 8 located in the positions of the contact holes 18 are unstable, and do not contribute to electrical connection between the common electrode 16 of the CF substrate 2 and the upper electrode 91 of the TFT substrate 1. If there are many such conductive gap members 8, the contact resistance between the transfer electrode 9 and the common electrode 16 increases.

Figure 4A:
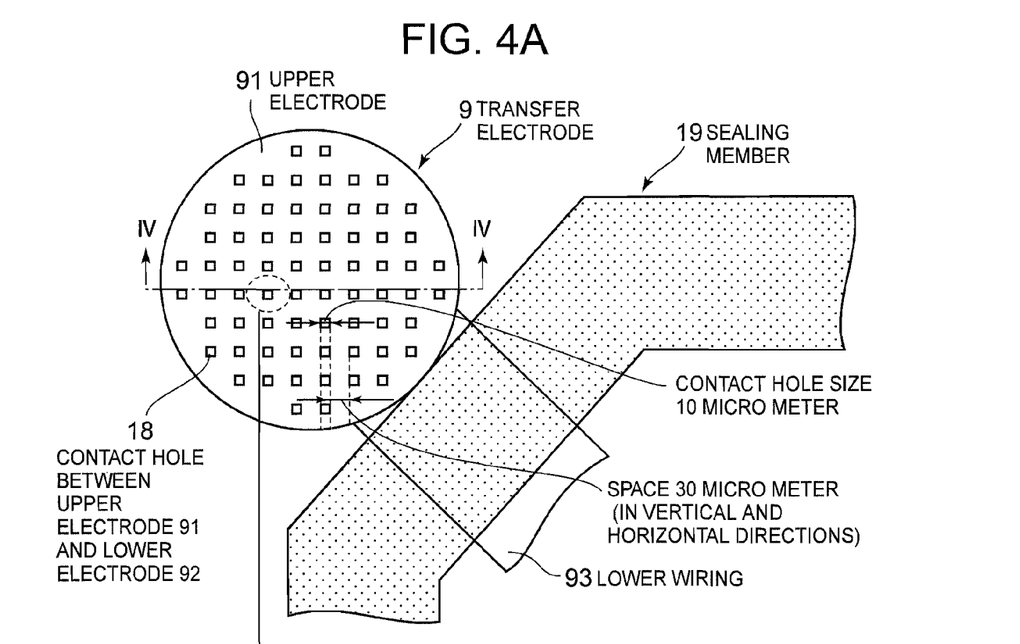
FIG. 4A is a plan view of a portion of a liquid crystal display according to an embodiment of the present invention.
Figure 4B:
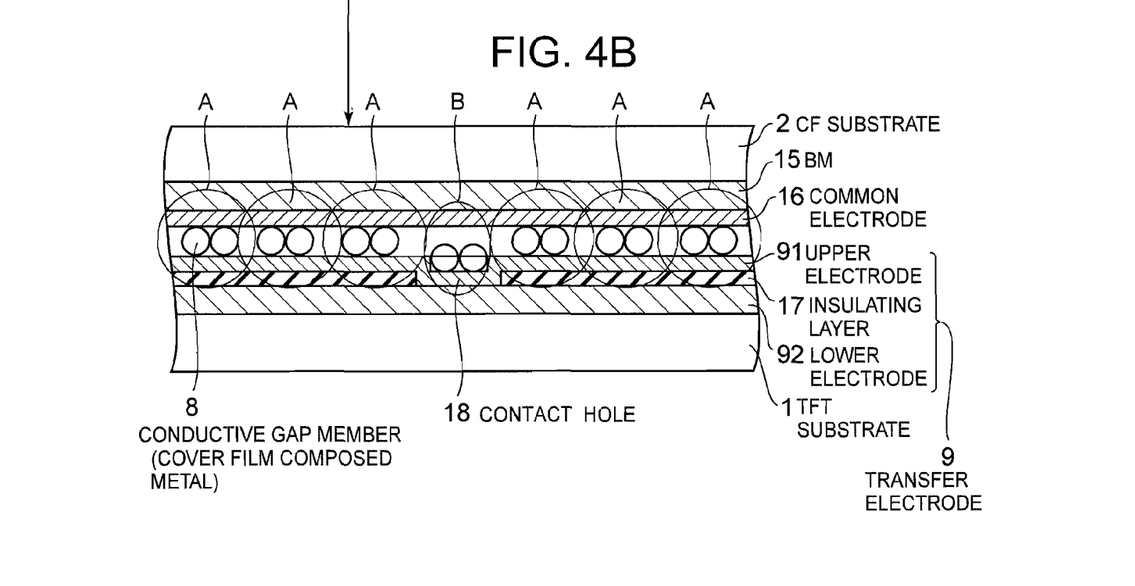
FIG. 4B is a cross-sectional view taken along the line IV-IV of FIG. 4A.

FIGS. 4A and 4B show another embodiment of the present invention addressing this potential problem. FIG. 4A is a plan view of a portion of a liquid crystal display according to this embodiment of the present invention. FIG. 4B is a cross-sectional view taken along the line IV-IV of FIG. 4A. As compared with the embodiment shown in FIGS. 2A and 2B, the size of the contact holes and the interval of the contact holes are modified to alleviate the potential problem discussed above.

Figure 5:
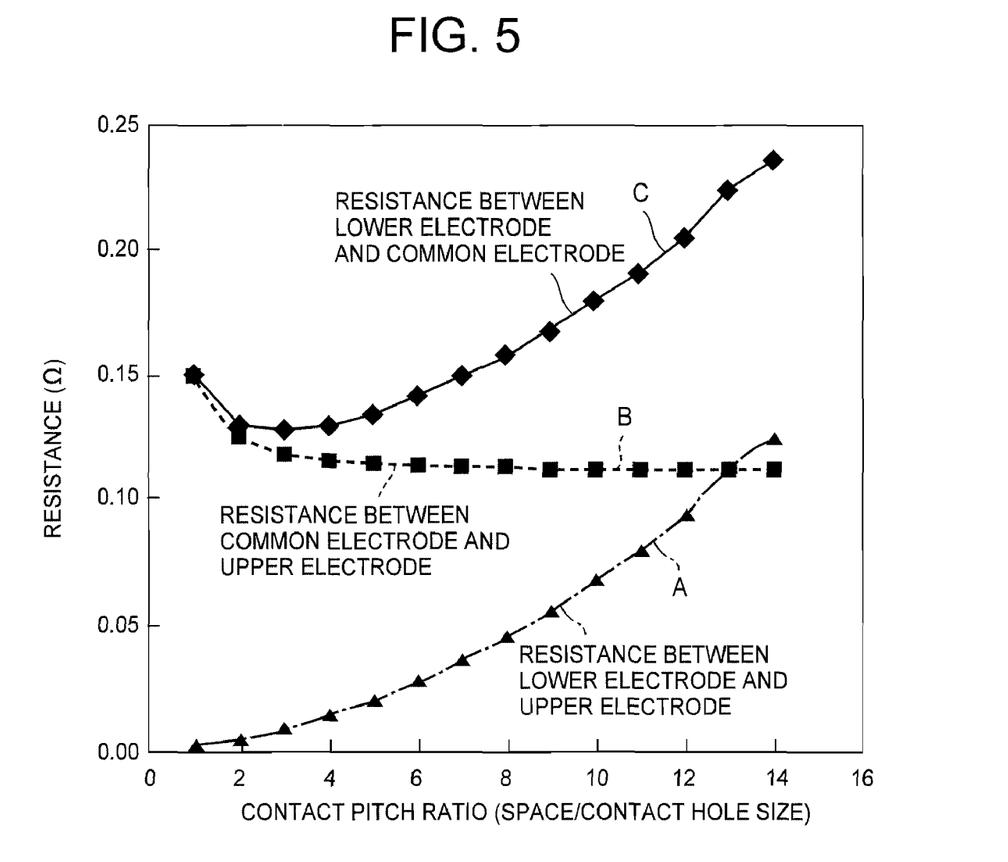
FIG. 5 is a graph showing a relationship between the contact hole pitch ratio and various resistances.

FIG. 5 is a graph showing a relationship between the contact pitch ratio and various resistances. The contact pitch ratio shown in the horizontal axis is the ratio of the lateral distance (either in the vertical direction or in the horizontal direction) between the two adjacent contact holes to the size (lateral dimension) of the contact holes. In this graph, the contact holes each have a substantially square shape of 10 μm×10 μm, and are disposed at an equal interval in the vertical and horizontal directions. As the conductive gap members 8, sphere particles of a diameter 5 μm are used. The conductive gap members 8 are distributed to be about 130 per mm$^2$. The lateral spacing between the two adjacent contact holes 18 is varied as a parameter. The vertical axis shows resistances. The resistance between the lower electrode 9 and the common electrode 16, the resistance between the common electrode 16 and the upper electrode 91, and the resistance between the lower electrode 92 and the upper electrode 91 are plotted in the graph.

By definition, as the contact pitch ratio increases, the lateral spacing between the contact holes 18 increases, thereby reducing the number of contact holes per unit area (increasing the non-conductive area). Therefore, as shown in FIG. 5, the resistance between the lower electrode 92 and the upper electrode 91 increases in this case (see the curve A). On the other hand, the resistance between the common electrode 16 and the upper electrode 91 decreases as the contact pitch ratio increases (see the curve B). This is because the area contributing to electrical connection between the common electrode 16 of the CF substrate 2 and the upper electrode 91 of the TFT substrate 1 via the conductive gap members 8 increases as the contact pitch ratio increases. The resistance between the lower electrode 92 and the common electrode 16 exhibits the curve C in FIG. 5 which is a combination of the curve A and the curve B. Thus, the resistance between the lower electrode 92 and the common electrode 16 decreases as the contact pitch ratio starts to increase from a value 1; achieves its minimum approximately when the contact pitch ratio is about 3; and is going to increase when the contact pitch ratio increases from about 3. Accordingly, when the contact pitch ratio is about 3, the electric resistance between the lower electrode 92 and the common electrode 16 is the smallest, yielding the optimum contact pitch ratio in this example.

Figure 6:
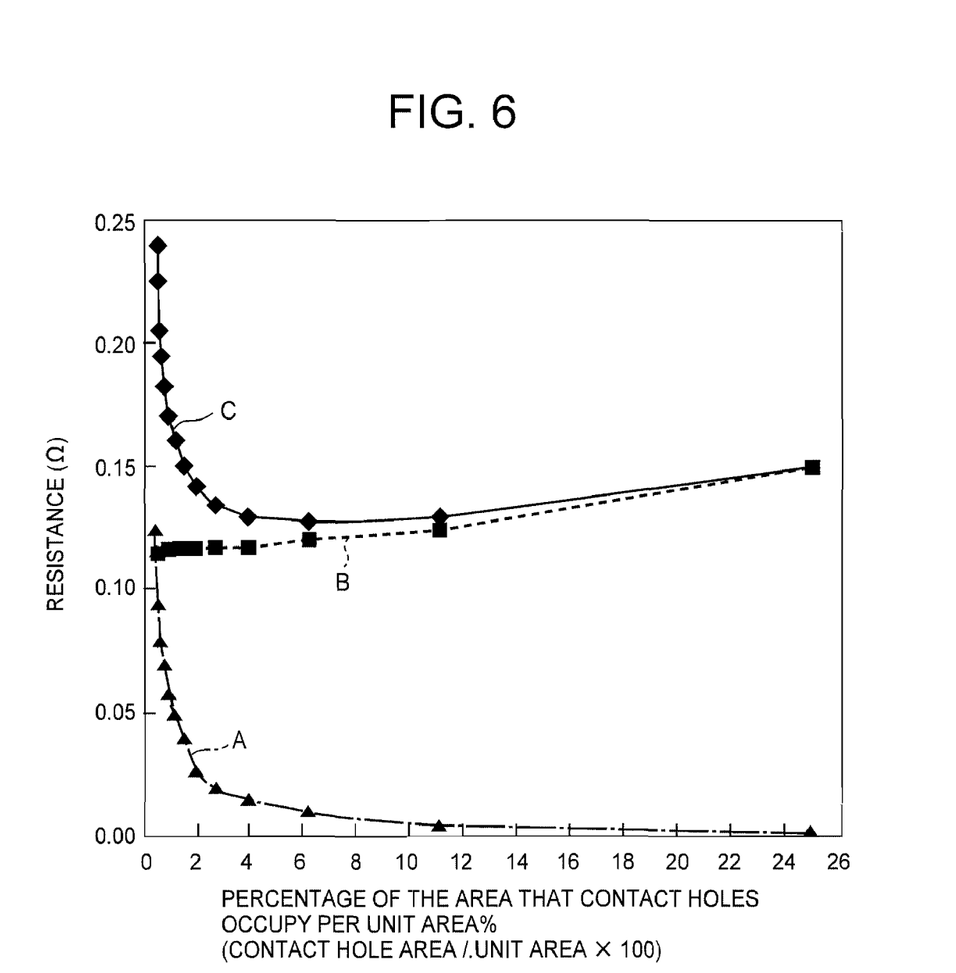
FIG. 6 is a graph showing a relationship between the area ratio of contact holes per unit area and various resistances.

FIG. 6 shows a graph in which the horizontal axis of the FIG. 5 is converted to the area ratio of the contact holes 18. That is, the horizontal axis of FIG. 6 shows the percentage of the area that contact holes occupy per unit area (referred to as the "contact hole area ratio"). According to FIG. 6, the resistance between the lower electrode 92 and the common electrode 16 decreases as the contact hole area ratio decreases from the initial value of 25%; achieves its minimum when the ratio is about 7%; and starts increasing when the contract hole area ratio decreases further from about 7%. Thus, when the contact hole area ratio is about 7%, the resistance between the lower electrode 92 and the common electrode 16 is the smallest, providing the optimum area ratio for contact holes.

FIGS. 4A and 4B show a case where the contact pitch ratio is about 3—i.e., the contact hole area ratio is about 7%. In this example, the size of the contact holes 18 is a square of 10 μm×10 μm, and the lateral spacing between the contact holes in vertical and horizontal directions is 30 μm. As in the case of FIG. 2B, portions indicated by "A" contribute to electrical connection between the upper electrode 91 and the common electrode 16, but portion "B" does not. Because the contact pitch ratio (and the contact hole area ratio) is appropriately selected based on the above analysis, the resistance between the lower electrode 92 and the common electrode 16 is made sufficiently low while at the same time providing for a corrosion resistive, reliable structure for the electrical connection of the two substrates.

As shown in FIGS. 5 and 6, when the contact pitch ratio is about 2 to about 6 (i.e., the contact hole area ratio is about 2% to about 11%), the resistance between the lower electrode 92 and the common electrode 16 is significantly lower than the resistance value at the contact pitch ratio of 1 (the contact hole area ratio of 25%). Depending on design needs and applications, any number in these ranges may be considered as acceptable and desirable.

Further, when the contact pitch ratio is about 7 (when the contact hole area ratio is about 1.5%), the resistance between the lower electrode and the common electrode is the same as that at the contact pitch ratio of 1 (at the contact hole area ratio of 25%). Thus, depending on design needs and applications, the contact pitch ratio of about 1 to about 7, or a range of about 1.5% to about 25% in terms of the contact hole area ratio, may be acceptable and may be considered as a desired structure.

Figure 7A:
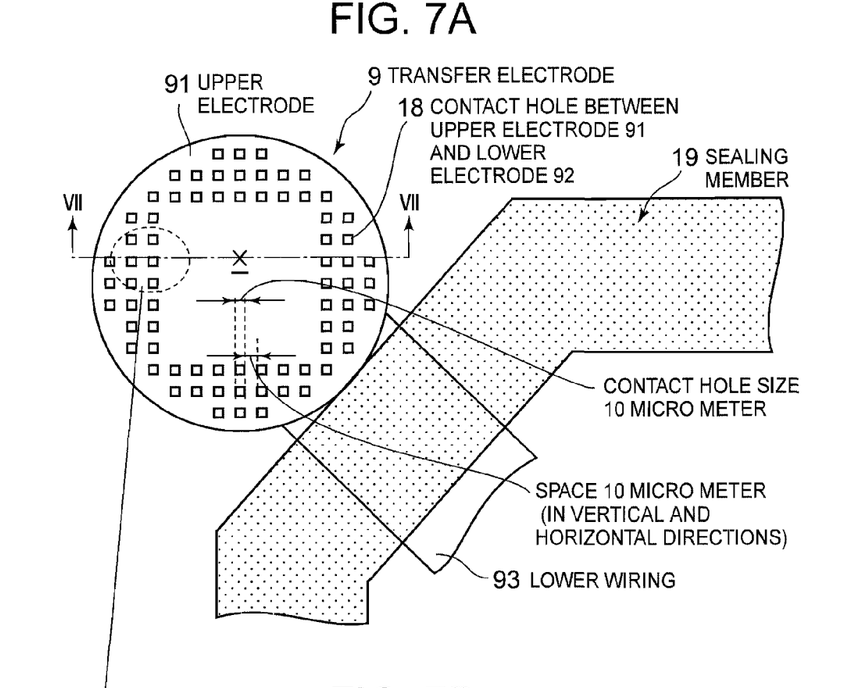
FIG. 7A is a plan view of a portion of a liquid crystal display according to an embodiment of the present invention.
Figure 7B:
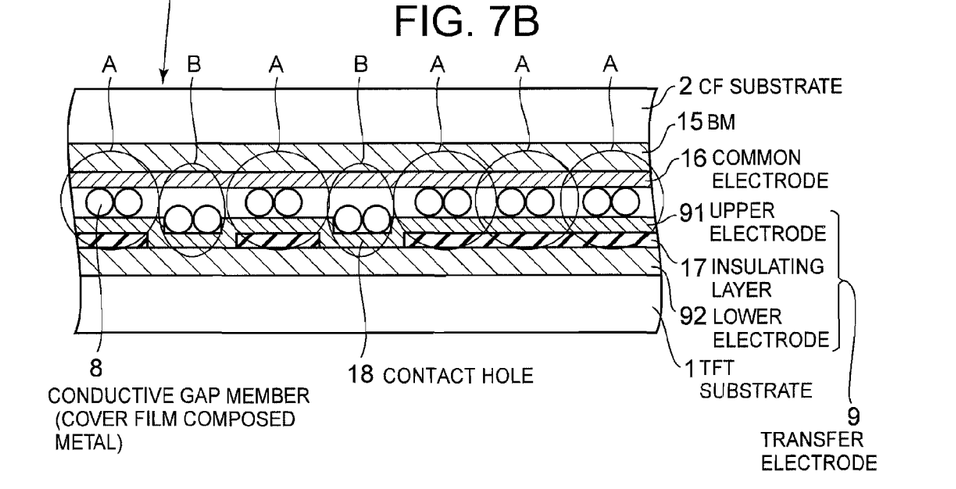
FIG. 7B is a cross-sectional view taken along the line VII-VII of FIG. 7A.
Figure 8A:
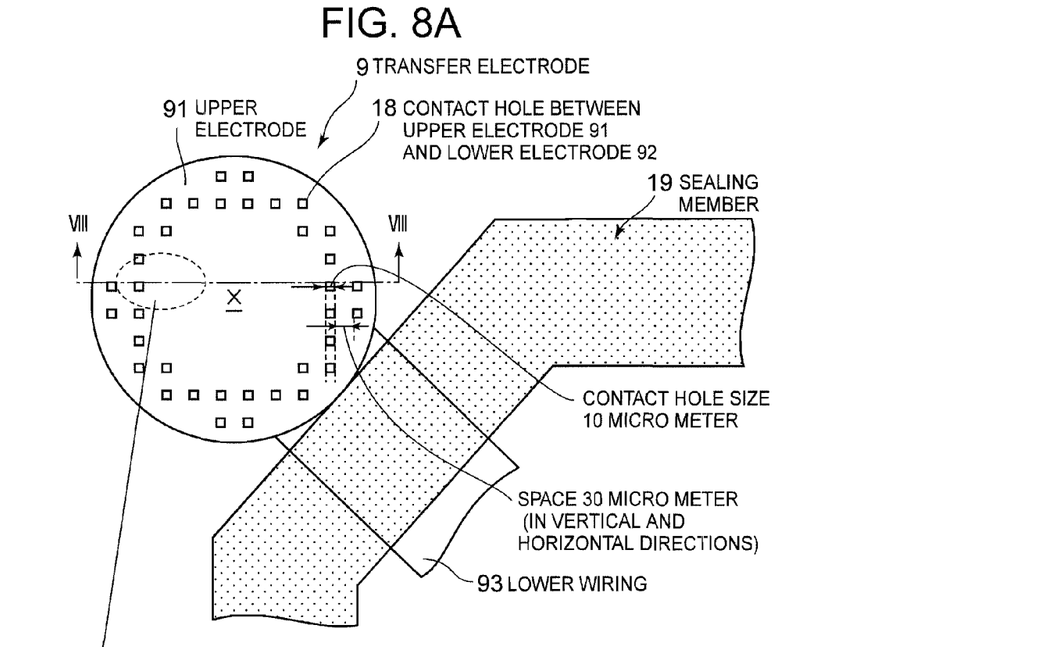
FIG. 8A is a plan view of a portion of a liquid crystal display according to an embodiment of the present invention.
Figure 8B:
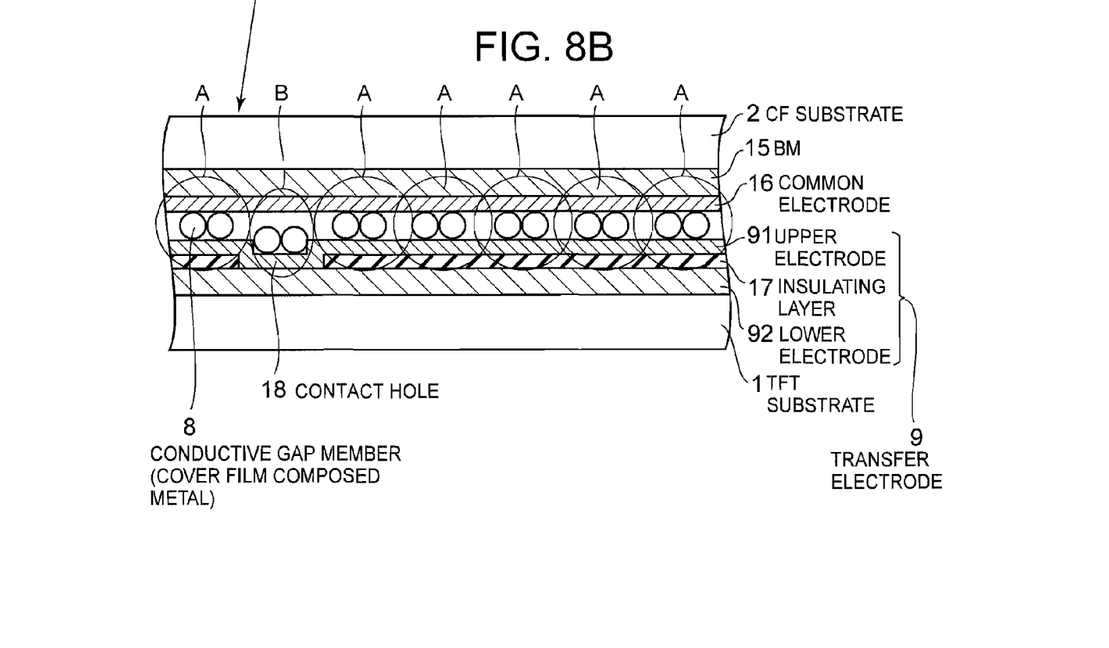
FIG. 8B is a cross-sectional view taken along the line VIII-VIII of FIG. 8A.

In the above embodiments, a plurality of contact holes 18 are dispersed relatively uniformly over the entire area of the transfer electrode 9. Alternatively, the contact holes 18 may be provided in a selected partial area relative to the area of the transfer electrode 9. Such embodiments are shown in FIGS. 7A to 8B. FIG. 7A is a plan view of a portion of a liquid crystal display according to an embodiment of the present invention. FIG. 7B is a cross-sectional view taken along the line VII-VII of FIG. 7A. FIG. 8A is a plan view of a portion of a liquid crystal display according to an embodiment of the present invention. FIG. 8B is a cross-sectional view taken along the line VIII-VIII of FIG. 8A. In the embodiment shown in FIGS. 7A and 7B, the contact holes 18 are disposed with a spacing (between the adjacent two contact holes) of 10 μm in the vertical and horizontal directions. In the embodiment shown in FIGS. 8A and 8B, the contact holes 18 are disposed with a spacing of 30 μm in the vertical and horizontal directions. However, as shown in the figures, in both embodiments, there exists an area (around the center in these examples) where there is no contact hole in the insulating layer 17. In these embodiments, the area in which contact holes are formed surrounds the area in which no contact hole is formed. Alternatively, depending on the design needs and manufacture conditions, it may be desirable to form the contact hole forming area near the edge of the transfer electrode 9.

In the above-described various embodiments, the conductive gap members may be rested in dents/recesses formed by the contact holes. This property can be advantageously utilized to distribute the conductive gap members substantially uniformly over the transfer electrode 9. That is, the conductive gap members in theses recesses are restricted in their lateral movements and may act as a barrier to prevent an undesirably large number of the conductive gap members from escaping out of the desired area over the transfer electrode 9.

Figure 9A:
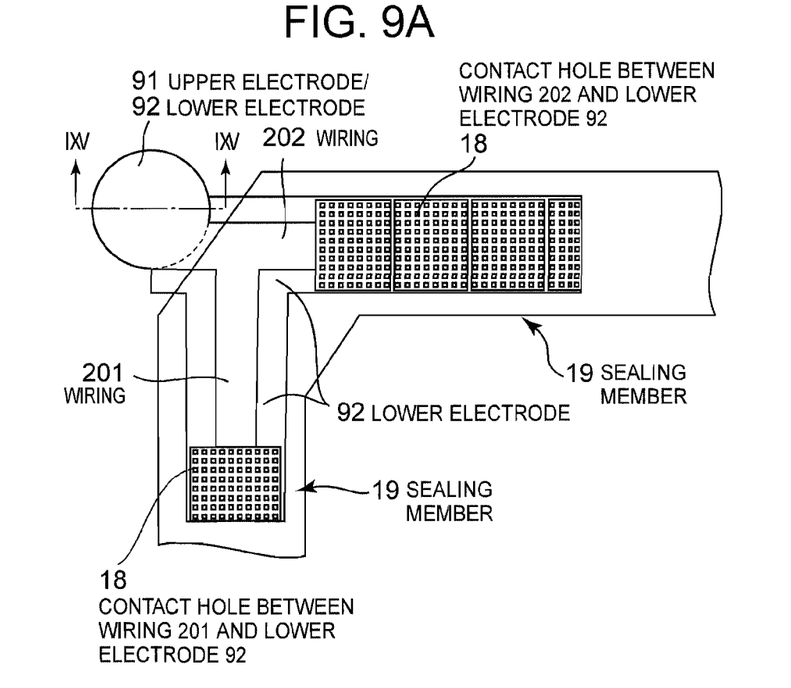
FIG. 9A is a plan view of a portion of a liquid crystal display according to an embodiment of the present invention.
Figure 9B:
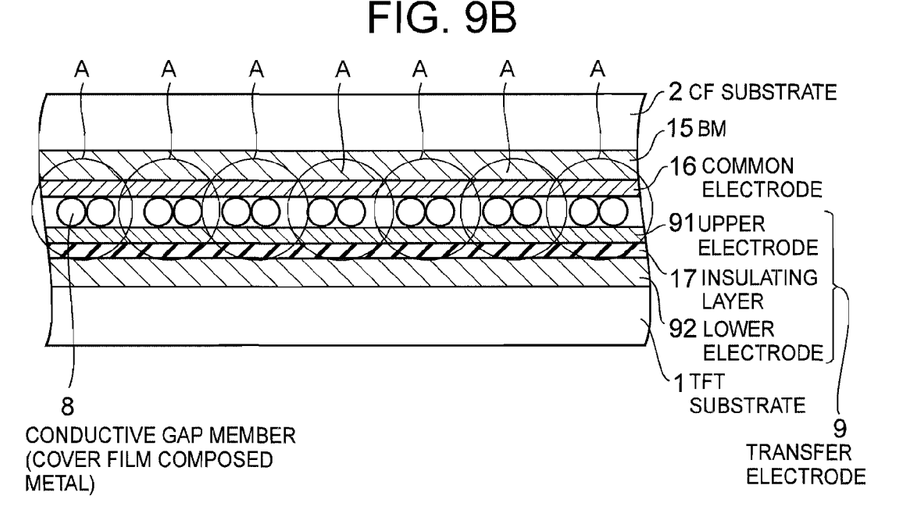
FIG. 9B is a cross-sectional view taken along the line IXV-IXV of FIG. 9A.

FIGS. 9A and 9B show another embodiment of the present invention. FIG. 9A is a plan view of a portion of a liquid crystal display according to an embodiment of the present invention. FIG. 9B is a cross-sectional view taken along the line IXV-IXV of FIG. 9A. Contrary to the above embodiments, in this embodiment, the area in which the lower electrode 92 is physically connected to the upper electrode 91 is provided separately from the area in which the upper electrode 91 is electrically connected to the common electrode 16 via conductive gap members.

As shown in FIGS. 9A and 9B, wirings 201 and 202, which extend from the upper electrode 91, are provided under the sealing member 19. The lower electrode 92 also has a pattern at the corresponding location at which a plurality of contact holes are also formed in the insulating layer 17. Thus, the wirings 201 and 202 are connected to the lower electrode 92 via the plurality of contact holes that are located under the sealing member 19. In other words, the upper electrode 91 and the lower electrode 92 are extended to an area located under the sealing member 19 and are connected to each other via contact holes 18 in that area so that the area establishing connection between the upper electrode 91 and the lower electrode 92 is located separately from the area in which the conductive gap members 8 are dispersed over the transfer electrode 9.

With this structure, the electrical connection between the common electrode 16 and the upper electrode 91 is established at portion "A" in FIG. 9B over the entire area because there is no recess due to contact holes in that region. Therefore, substantially all the conductive gap members contribute to electric connection between the common electrode 16 and the upper electrode 91, and a reliable connection between the common electrode 16 and the upper electrode 91 is established. While the upper electrode 91 and the lower electrode 92 are not electrically connected in this area, they are electrically connected via the contact holes 18 formed in the insulating layer 17 through the wirings 201 and 202 that are provided under the sealing member 19. Because these contact holes are provided under the sealing member 19, this structure does not require an additional area for establishing connection between the upper electrode 91 and the lower electrode 92. Thus, the lateral dimensions of the liquid crystal display need not be enlarged.

In the above embodiments, the shape of the contact holes was square. However, the two-dimensional shape of the contact holes can be circular, rectangular or any other appropriate shape.

It will be apparent to those skilled in the art that various modification and variations can be made in the liquid crystal display device of the present invention without departing from the spirit or scope of the invention. Thus, it is intended that the present invention cover modifications and variations that come within the scope of the appended claims and their equivalents.

What is claimed is:

1. A liquid crystal display device, comprising:
    a first substrate having a common electrode thereon;
    a second substrate coupled to the first substrate, the second substrate having a connection electrode facing a portion of the common electrode on the first substrate, the connection electrode including a lower electrode made of metal, an insulating layer formed over the lower electrode and having a plurality of contact holes, and an upper electrode made of oxide conductor over the insulating layer, the upper electrode being electrically connected to the lower electrode via the plurality of contact holes; and
    a plurality of conductive gap members disposed between said portion of the common electrode and the upper electrode of the connection electrode to electrically connect said portion of the common electrode to the upper electrode of the connection electrode,
    wherein the plurality of contact holes are formed in a peripheral area to avoid a central area of the connection electrode, and said lower electrode is present below said central area of the connection electrode.

2. The device according to claim 1, wherein a surface profile of the upper electrode has recesses at locations generally corresponding to the contact holes in the insulating layer, the plurality of conductive gap members being in contact with both said portion of the common electrode and the upper electrode of the connection electrode at locations other than recessed areas.

3. The device according to claim 1, wherein the plurality of contact holes each have a substantially square shape and are disposed at a substantially constant pitch in lateral directions, a ratio of a length of a side of the contact hole to a distance between two adjacent contact holes in the peripheral area being about 1 to about 7.

4. The device according to claim 3, wherein said ratio is about 2 to about 6.

5. The device according to claim 3, wherein said ratio is about 3.

6. The device according to claim 1, wherein a percentage of an area that the contact holes in the peripheral area occupy relative to a unit area is about 1.5% to about 25%.

7. The device according to claim 6, wherein said percentage is about 2% to about 11%.

8. The device according to claim 7, wherein said percentage is about 7%.

9. The device according to claim 1, wherein the second substrate further includes a plurality of active elements and a plurality of pixel electrodes respectively connected to the active elements on a surface facing the first substrate, and
    wherein the lower electrode of the connection electrode is connected to an auxiliary capacitance line that is provided to form capacitances together with the pixel electrodes.

10. The device according to claim 1, further comprising a sealing member that seals a space between the first substrate and the second substrate, wherein the upper electrode of the connection electrode is electrically connected to said portion of the common electrode via the conductive gap members outside of an area defined by the sealing member.

11. The device according to claim 1, further comprising a sealing member that seals a space between the first substrate and the second substrate, wherein at least some of said plurality of contact holes are formed in the insulating layer at locations corresponding to a portion of said sealing member.

12. The device according to claim 1, wherein said upper electrode is formed of transparent conductive oxide.

13. The device according to claim 1, wherein said upper electrode is formed of Indium Tin Oxide (ITO).

14. The device according to claim 1, wherein said contact hole is formed in a rectangular shape.

15. The device according to claim 1, wherein said conductive gap members are in a substantially sphere shape, and an area of said contact holes is larger than a diameter of the conductive gap member.

16. The device according to claim 1, wherein said contact holes are in one of a square shape, a rectangular shape, and a circular shape.

17. The device according to claim 1, wherein the plurality of contact holes are disposed to have a 90 or 180 degree rotational symmetry on the lower electrode.

* * * * *